(12) United States Patent
Kono

(10) Patent No.: US 10,673,730 B2
(45) Date of Patent: Jun. 2, 2020

(54) METHOD AND APPARATUS TO MANAGE IT INFRASTRUCTURE BASED ON APPLICATION CHARACTERISTICS

(71) Applicant: HITACHI, LTD., Chiyoda-ku, Tokyo (JP)

(72) Inventor: Yasutaka Kono, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 81 days.

(21) Appl. No.: 15/750,813

(22) PCT Filed: Aug. 31, 2015

(86) PCT No.: PCT/US2015/047807
§ 371 (c)(1),
(2) Date: Feb. 6, 2018

(87) PCT Pub. No.: WO2017/039627
PCT Pub. Date: Mar. 9, 2017

(65) Prior Publication Data
US 2018/0234327 A1 Aug. 16, 2018

(51) Int. Cl.
*H04L 12/26* (2006.01)
*H04L 12/24* (2006.01)
(Continued)

(52) U.S. Cl.
CPC .............. *H04L 43/16* (2013.01); *G06F 9/455* (2013.01); *G06F 9/45558* (2013.01); *G06F 11/302* (2013.01); *G06F 11/3006* (2013.01); *G06F 11/3051* (2013.01); *G06F 11/3442* (2013.01); *G06F 11/3452* (2013.01); *H04L 41/069* (2013.01); *H04L 41/0896* (2013.01); *G06F 9/44505* (2013.01); *G06F 2009/4557* (2013.01); *G06F 2009/45591* (2013.01);
(Continued)

(58) Field of Classification Search
CPC ... H04L 43/16; H04L 41/069; H04L 41/0896; G06F 9/455; G06F 9/45558; G06F 11/3006; G06F 11/302; G06F 11/3051; G06F 11/3442
USPC ........................................................ 709/204
See application file for complete search history.

(56) References Cited

U.S. PATENT DOCUMENTS 8,738,972 B1 * 5/2014 Bakman .............. G06F 11/0712
714/47.1
9,305,000 B1 * 4/2016 Bandopadhyay ....... G06F 16/13
(Continued)

OTHER PUBLICATIONS

International Search Report for related International Application No. PCT/US2015/047807 dated Dec. 1, 2015, 2 pages.

*Primary Examiner* — S M A Rahman
*Assistant Examiner* — Chen-Liang Huang
(74) *Attorney, Agent, or Firm* — Procopio, Cory, Hargreaves & Savitch LLP

(57) ABSTRACT

Example implementations described herein are directed to systems and methods for using and updating performance thresholds based on application characteristics. Example implementations compare monitored performance metrics with thresholds having similar application characteristics as the one monitored. Example implementations further manage remediation plans to solve performance issues based on application characteristics. In example implementations, management software retrieves existing plans created for similar situations in response to an issued alert.

11 Claims, 24 Drawing Sheets

(51) Int. Cl.
  *G06F 11/34*  (2006.01)
  *G06F 11/30*  (2006.01)
  *G06F 9/455*  (2018.01)
  *G06F 9/445*  (2018.01)

(52) U.S. Cl.
  CPC ...... *G06F 2201/81* (2013.01); *H04L 41/5009* (2013.01); *H04L 41/5054* (2013.01)

(56) References Cited

U.S. PATENT DOCUMENTS

| | | |
|---|---|---|
| 2003/0079160 A1 | 4/2003 | McGee et al. |
| 2008/0097801 A1* | 4/2008 | MacLellan .......... G06F 11/3409 709/224 |
| 2011/0145932 A1 | 6/2011 | Nerger et al. |
| 2012/0089726 A1 | 4/2012 | Doddavula |
| 2013/0047158 A1* | 2/2013 | Jadhav ................. G06F 9/5077 718/1 |

* cited by examiner

| | ID | Type | OS Name | OS Version | Application Name | Application Version | Location |
|---|---|---|---|---|---|---|---|
| 242A | 01 | RDB | Ubuntu | 14.10 | MySQL | 6.6 | Storage System 01 Volume 01 |
| 242B | 02 | NoSQL DB | CentOS | 6.5 | MongoDB | 2.6 | Storage System 01 Volume 02 |
| 242C | 03 | Web Server | SUSE | 12 | Apache | 2.4.10 | Storage System 02 Volume 01 |
| | : | : | : | : | : | : | : |

FIG. 3

| | ID | VM Type | Processor Type | Processor Performance | # of Processors | Memory | Max IOPS | Unit Price |
|---|---|---|---|---|---|---|---|---|
| 243A | 01 | Normal | Normal | 1 | 2 | 4GB | 50,000 | 10 |
| 243B | 02 | High Memory | High | 10 | 8 | 32GB | 100,000 | 30 |
| 243C | 03 | High CPU | GPU | 20 | 16 | 8GB | 100,000 | 80 |
| 243D | 04 | High I/O | High | 10 | 16 | 8GB | 50,000 | 90 |
| | : | : | : | : | : | : | : | : |

FIG. 4

| | ID | Processor (# of core) | Port (Gbps) | Cache (GB) | Pool (TB) |
|---|---|---|---|---|---|
| 251A | 01 | P-01 (8) | A (8), B (8) | C-01 (160) | Pool-01 (300), Pool-02 (300) |
| 251B | 01 | P-02 (8) | C (8), D (8) | C-02 (128) | Pool-03 (500), Pool-04 (500) |
| 251C | 02 | P-01 (8) | A (8), B (8) | C-01 (128) | Pool-01 (200), Pool-02 (300) |
| 251D | 03 | P-01 (8) | A (8), B (8) | C-01 (32) | Pool-01 (100), Pool-02 (300) |
| | : | : | : | : | : |

FIG. 5

|  | 2521 | 2522 | 2523 | 2524 |
|---|---|---|---|---|
|  | Storage ID | Volume ID | Capacity (TB) | Pool ID |
| 252A | 01 | 01 | 10 | Pool-01 |
| 252B | 01 | 02 | 20 | Pool-04 |
| 252C | 02 | 01 | 5 | Pool-01 |
| 252D | 02 | 02 | 4 | Pool-01 |
| 252E | 02 | 03 | 10 | Pool-02 |
|  | : | : | : | : |

|  | ID | CPU (# of core, Type) | Memory | Port (Gbps) |
|---|---|---|---|---|
| 253A | 01 | 12 Core, Normal | 32 GB | A(4), B(4) |
| 253B | 02 | 32 Core, High | 256 GB | A(8), B(8) |
| 253C | 03 | 24 Core, High | 256 GB | A(8) |
| 253D | 04 | 24 Core, High | 128 GB | A(16), B(16) |
|  | : | : | : | : |

FIG. 7

| | ID | Physical Server ID | CPU (# of core) | Memory | Port (Gbps) |
|---|---|---|---|---|---|
| 254A | 01 | 01 | 2 Core | 4 GB | A(4) |
| 254B | 02 | 01 | 8 Core | 32 GB | B(8) |
| 254C | 03 | 02 | 16 Core | 8 GB | A(8) |
| 254D | 04 | 02 | 16 Core | 8 GB | A(16) |
| | : | : | : | : | : |

FIG. 8

| | 2551 | 2552 | 2553 | 2554 | 2555 | 2556 | 2557 | 2558 | 2559 |
|---|---|---|---|---|---|---|---|---|---|
| | Application ID | Application Name | Catalog ID | Virtual Server ID | Virtual Server Name | Virtual Server Port | Storage ID | Storage Port ID | Volume ID |
| 255A | 1 | OLTP-B | 2 | 01 | OLTP-B-A | A | 01 | A | 011 |
| | | | | 02 | OLTP-B-2 | A | 01 | C | 021 |
| | | | | | | B | 02 | C | 021 |
| 255B | 2 | Web-C | 4 | 03 | Webdb | A | 02 | B | 052 |
| | | | | | | A | 01 | A | 055 |
| 255C | 3 | OLAP-E | 3 | 04 | OLAP-E-1 | C | 03 | D | 063 |
| | | | | 05 | OLAP-E-2 | B | 02 | C | 105 |
| 255D | 2 | Web-c | 4 | 06 | WebLogic | D | 01 | A | 120 |
| | | | | 07 | WebFront-1 | B | 03 | A | 050 |
| | | | | | | B | 03 | B | 051 |
| 255E | 4 | DEV-C | 6 | 08 | Dev-C-1 | C | 04 | C | 023 |
| | | | | 09 | Dev-C-2 | A | 05 | D | 225 |
| 255F | 2 | Web-C | 4 | 10 | WebFront-2 | C | 05 | E | 221 |
| 255G | 5 | Mail-A | 5 | 11 | Mail-A-1 | D | 04 | A | 235 |
| | | | | 12 | Mail-A-2 | E | 06 | A | 248 |
| | | | | | | A | 04 | B | 249 |
| | | | | 13 | Mail-A-3 | A | 03 | C | 101 |
| | | | | 14 | Mail-A-4 | B | 04 | B | 111 |
| | : | : | : | : | : | : | : | : | : |

FIG. 9

|   | Storage ID | Storage Volume ID | History ID | Processor Usage | | | Cache Usage | Pool Usage | Port Usage |
|---|---|---|---|---|---|---|---|---|---|
|   |   |   |   | P-01 | ... | P-32 |   |   |   |
| 256A | 01 | 01 | 0 | 50% | ... | 55% | 16% | 54% | 20% |
|   |   |   | 1 | 25% | ... | 18% | 40% | 67% | 64% |
|   |   |   | 2 | 64% | ... | 34% | 60% | 56% | 70% |
|   |   |   | : | : | ... | : | : | : | : |
| 256B | 02 | 01 | 0 | 80% | ... | 79% | 34% | 18% | 32% |
|   |   |   | 1 | 46% | ... | 65% | 41% | 40% | 14% |
|   |   |   | 2 | 20% | ... | 15% | 26% | 34% | 53% |
|   |   |   | : | : | ... | : | : | : | : |
| : | : | : | : | : | ... | : | : | : | : |

FIG. 10

|  |  | Storage ID | Physical Server Flag | History ID | CPU Usage | | Memory Usage | Disk Usage | Port Usage |
|---|---|---|---|---|---|---|---|---|---|
|  |  |  |  |  | CPU 0 | CPU 31 |  |  |  |
|  |  |  |  | 0 | 14% | ... 22% | 24% | 50% | 30% |
| 257A |  | 01 | YES | 1 | 15% | ... 18% | 30% | 70% | 34% |
|  |  |  |  | 2 | 14% | ... 19% | 25% | 66% | 40% |
|  |  |  |  | : | : | ... : | : | : | : |
|  |  |  |  | 0 | 20% | ... 30% | 50% | 10% | 20% |
| 257B |  | 02 | NO | 1 | 21% | ... 10% | 43% | 20% | 2% |
|  |  |  |  | 2 | 25% | ... 15% | 30% | 14% | 30% |
|  |  |  |  | : | : | ... : | : | : | : |
|  |  | : | : | : | : | ... : | : | : | : |

FIG. 11

| | ID | TIME | Threshold ID | Thresholds | Workloads | Workloads Trend |
|---|---|---|---|---|---|---|
| 259A | 0 | 06/18/2015 0:05 | 0 | [Storage]<br>Processor: 80%, Cache: 60%<br>Pool: 80%, Port: 70%<br><br>[Server]<br>CPU: 70%, Memory: 65%<br>Disk: 90%, Port: 80% | [Storage]<br>Processor: 81%, Cache: 50%<br>Pool: 50%, Port: 30%<br><br>[Server]<br>CPU: 30%, Memory: 50%<br>Disk: 40%, Port: 30% | gradual increase |
| 259B | 1 | 06/05/2015 0:03 | 1 | [Storage]<br>Processor: 80%, Cache: 60%<br>Pool: 80%, Port: 70%<br><br>[Server]<br>CPU: 70%, Memory: 65%<br>Disk: 90%, Port: 80% | [Storage]<br>Processor: 81%, Cache: 50%<br>Pool: 50%, Port: 30%<br><br>[Server]<br>CPU: 30%, Memory: 50%<br>Disk: 40%, Port: 30% | gradual increase |
| 259C | 2 | 06/15/2015 0:09 | 1 | [Storage]<br>Processor: 90%, Cache: 65%<br>Pool: 60%, Port: 70%<br><br>[Server]<br>CPU: 80%, Memory: 60%<br>Disk: 60%, Port: 80% | [Storage]<br>Processor: 50%, Cache: 20%<br>Pool: 30%, Port: 50%<br><br>[Server]<br>CPU: 50%, Memory: 20%<br>Disk: 40%, Port: 95% | spikey increase |
| | : | : | : | | : | : |

1610-B — Application Type: RDB

1620-B — Application Name: DB-A

1630-B — Number of VMs: 2

1640-B — VMs being provisioned:

| VM Name | CPU | Memory | Capacity |
|---|---|---|---|
| DB-A-1 | 16 x High | 8GB | 2TB |
| DB-A-2 | 16 x High | 8GB | 2TB |

- 1641-B: VM Name
- 1642-B: CPU
- 1643-B: Memory
- 1644-B: Capacity
- 164A-B: DB-A-1 row
- 164B-B: DB-A-2 row 1650-B — Total Cost: 180

1660-B: OK  1670-B: Cancel  1680-B: Back

| ID | Application ID | Log |
|---|---|---|
| 0 | 0 | 7/10 3:00  application started.<br>7/10 3:01  initializing...<br>7/10 3:05  initialization completed.<br>7/10 3:10  [SQL] SELECT id, name FROM customers WHERE id > 1000 AND id < 2000<br>7/10 3:12  getting access logs of these customers from web servers.<br>7/10 3:13  picking-up customers who accessed web servers recently.<br>7/10 3:16  [SQL] SELECT id, item_id, date FROM purchase_orders WHERE customer_id IN (1102, 1230, 1300, 1450, 1578, 1879, 1901, 1914, 1943, 1950)<br>7/10 3:18  analyzing customers' preferences...<br>: |
| 1 | 1 | (omitted) |
| 2 | 2 | (omitted) |
| : | : | : |

FIG. 18

| | ID | Alert ID | Remediation Plan | Last Execution Time | Effects |
|---|---|---|---|---|---|
| 25AA | 0 | 0 | Allocate one additional storage processor | 06/18/2015 0:05 | [Storage] Processor: 81%=40% |
| 25AB | 1 | 1 | Modify port allocation from Port A to Port B. | 06/05/2015 0:03 | [Storage] Processor: 71%=60% |
| 25AC | 2 | 2 | Migrate VM from Physical Server 01 to Physical Server 05. | null | [Storage] Processor: 95%=50% |
| | : | : | : | | : |

25A0 (table); columns: 25A1 ID, 25A2 Alert ID, 25A3 Remediation Plan, 25A4 Last Execution Time, 25A5 Effects

FIG. 20

METHOD AND APPARATUS TO MANAGE IT INFRASTRUCTURE BASED ON APPLICATION CHARACTERISTICS

CROSS-REFERENCE TO RELATED APPLICATIONS

This application is a U.S. National Stage entry of PCT Application No: PCT/US2015/047807 filed Aug. 31, 2015, the contents of which are incorporated herein by reference.

BACKGROUND

Field

The present disclosure relates generally to information technology (IT) systems, and more specifically, to management of IT systems based on applications executed on the IT system.

Related Art

In the related art, there are growing needs for deploying new IT systems (applications and IT resources) or for changing existing IT systems quickly to adapt to rapid changes in the business environment. Thus, IT infrastructure administrators may need to manage IT resources flexibly and effectively to support applications that are deployed or changed quickly and frequently.

Related art solutions involve methods to automate management of IT resources based on knowledge, such as thresholds setting based on statistical performance data, effects of configuration changes executed in the past, and so on. Such solutions include systems and methods for adaptive threshold determination for performance metrics, as well as systems and methods for dynamically generating alarm thresholds for performance metrics, and for applying those thresholds to generate alarms. In such related art solutions, statistical methods are used to generate one or more thresholds for metrics that may not fit a Gaussian or normal distribution, or that may exhibit cyclic behavior or persistent shifts in the values of the metrics. The statistical methods used to generate the thresholds may include statistical process control (SPC) methods, normalization methods, and heuristics. An example of such a related art implementation can be found at U.S. Patent Publication No. 2003/0079160, hereby incorporated by reference herein for all purposes in its entirety.

In related art solutions, there are techniques for the dynamic provisioning of resources within a cloud computing environment. Such related art systems provide a workload optimization approach that measures workload performance across combinations of hardware (platform, network configuration, storage configuration, etc.) and operating systems (OS), and provides workload placement on the platforms where jobs can be operated with efficiency. In addition to performance such as throughput and response time, power consumption and reliability are also considered. Further, related art solutions allow for the execution of migration processes, if required. An example of such a related art implementation can be found in U.S. Patent Publication No. 2011/0145932, hereby incorporated by reference in its entirety for all purposes.

SUMMARY

In the related art, infrastructure administrators may not have visibility to make modifications on applications in general. Thus, from the perspective of infrastructure administrators, workloads of the applications may appear to change suddenly from an infrastructure point of view. If infrastructure administrators manage IT systems based on previously obtained knowledge or statistical data, it may result in improper and ineffective management.

In example implementations, there is a management program that uses and updates performance thresholds with considering applications' characteristics. The management program compares monitored performance metrics with thresholds having similar application characteristics as the one monitored.

In example implementations, the management program manages remediation plans to solve performance issues while considering application characteristics. In response to an alert issued, the management software retrieves existing plans created for similar situations.

In example implementations, there are methods and apparatuses for managing performance thresholds while considering application characteristics. Example implementations involve methods and apparatus for creating and managing remediation plans to solve performance issues with considering application characteristics.

In example implementations, the management program uses and updates performance thresholds while considering application characteristics. The management program compares monitored performance metrics with thresholds having similar application characteristics as the one monitored.

In example implementations, the management program manages remediation plans to solve performance issues while considering application characteristics. By responding to an alert issued, the management software retrieves existing plans created for similar situations.

Aspects of the present disclosure include a management server configured to manage a system over a network. The system may involve a storage system and a server configured to manage the storage system. The management server may include a memory configured to store a plurality of thresholds, each of the plurality of thresholds associated with a system resource of the system, and a plurality of characteristics of applications executed on the system, wherein each of one or more sets of the plurality of characteristics is associated with a corresponding set of thresholds from the plurality of thresholds. The management server may also include a processor, configured to monitor one or more applications executed on the system; monitor system resources of the system; determine, from characteristics of the one or more applications executed on the system, an associated set of characteristics from the one or more sets of the plurality of characteristics; and for the associated set of characteristics being found from the determination, compare the system resources to the corresponding set of thresholds associated with the associated set of characteristics from the one or more sets of the plurality of characteristics.

Additional aspects of the present disclosure include a method for managing a system over a network, the system having a storage system and a server configured to manage the storage system. The method can include managing a plurality of thresholds, each of the plurality of thresholds associated with a system resource of the system, and a plurality of characteristics of applications executed on the system, wherein each of one or more sets of the plurality of characteristics is associated with a corresponding set of thresholds from the plurality of thresholds, monitoring one or more applications executed on the system; monitoring system resources of the system; determining, from characteristics of the one or more applications executed on the system, an associated set of characteristics from the one or more sets of the plurality of characteristics; and for the associated set of characteristics being found from the determination, comparing the system resources to the corresponding set of thresholds associated with the associated set of characteristics from the one or more sets of the plurality of characteristics.

Aspects of the present disclosure further include a computer program for managing a system over a network, the system including a storage system and a server configured to manage the storage system, the computer program having instructions for executing a process, including managing a plurality of thresholds, each of the plurality of thresholds associated with a system resource of the system, and a plurality of characteristics of applications executed on the system, wherein each of one or more sets of the plurality of characteristics is associated with a corresponding set of thresholds from the plurality of thresholds, monitoring one or more applications executed on the system; monitoring system resources of the system; determining, from characteristics of the one or more applications executed on the system, an associated set of characteristics from the one or more sets of the plurality of characteristics; for the associated set of characteristics being found from the determination, comparing the system resources to the corresponding set of thresholds associated with the associated set of characteristics from the one or more sets of the plurality of characteristics; and for the associated set of characteristics not being found from the determination, generating a set of thresholds for the characteristics of the one or more applications executed on the system.

BRIEF DESCRIPTION OF DRAWINGS

FIG. 3 illustrates an image catalog table, in accordance with an example implementation.

FIG. 4 illustrates a VM Template Table, in accordance with an example implementation.

FIG. 5 illustrates a Storage Array Table, in accordance with an example implementation.

FIG. 6 illustrates a Storage Volume Table, in accordance with an example implementation.

FIG. 7 illustrates a Physical Server Table, in accordance with an example implementation.

FIG. 8 illustrates a Virtual Server Table, in accordance with an example implementation.

FIG. 9 illustrates the Mapping Table, in accordance with an example implementation.

FIG. 10 illustrates the Storage Performance Table, in accordance with an example implementation.

FIG. 11 illustrates the Server Performance Table, in accordance with an example implementation.

FIG. 13 illustrates an Alert Table, in accordance with an example implementation.

FIG. 15 illustrates a Self Service Portal with a Confirmation GUI, in accordance with an example implementation.

FIG. 18 illustrates an Application Log Database, in accordance with an example implementation.

FIG. 20 illustrates a remediation plan table in accordance with an example implementation.

DETAILED DESCRIPTION OF THE DRAWINGS

Figure 1A:
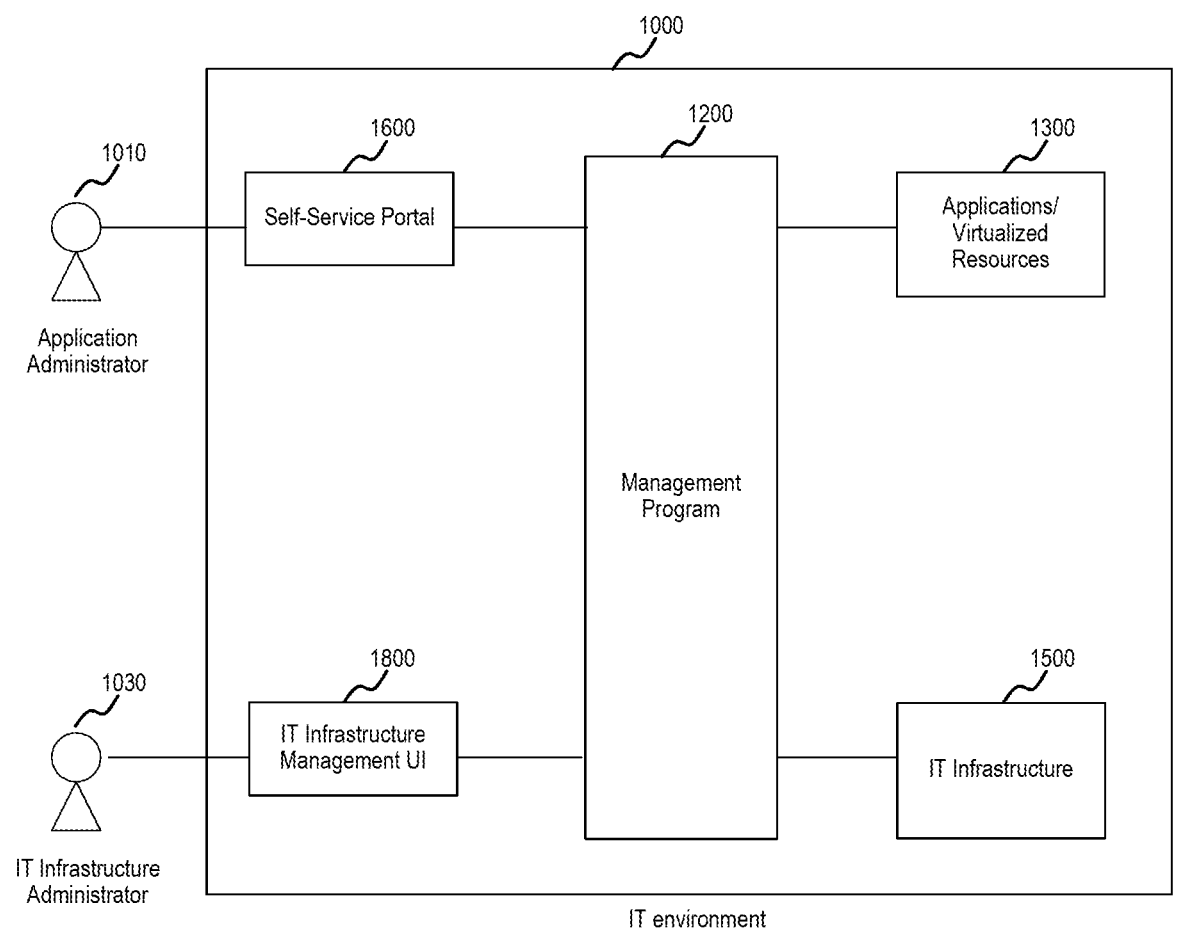
FIG. 1(a) illustrates a logical configuration of the system in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present disclosure.

As infrastructure administrators do not have access to such modifications on applications in general, workloads of the applications appear to change suddenly from infrastructure points of view. If the infrastructure administrators manage IT systems based on previously obtained knowledge or statistical data, improper and ineffective management may result.

In example implementations described herein, the management program uses and updates performance thresholds while taking application characteristics into consideration. The management program compares monitored performance metrics with thresholds having similar application characteristics as the one monitored. The management program manages remediation plans to solve performance issues with considering applications' characteristics. Responding to an alert issued, management software retrieves existing plans created for similar situations.

In example implementations, the management program can manage performance thresholds properly and avoid updating them based on different activities of applications. Management program can also provide remediation plans matched to the situations.

In an example implementation described below, there is a management program configured to manage performance thresholds with considering application characteristics.

FIG. 1(a) illustrates a logical configuration of the system, in accordance with an example implementation. Specifically, FIG. 1(a) illustrates an example of a logical configuration of the system in which the method and apparatus of example implementations may be applied. IT environment 1000 can involve management program 1200, applications and virtualized resources 1300, IT infrastructure 1500, self-service portal 1600 and IT infrastructure management user interface (UI) 1800. The application administrator 1010 can utilize the IT environment 1000 via self-service portal 1600. The IT infrastructure administrator 1030 can utilize the IT environment 1000 via IT infrastructure management UI 1800.

Figure 1B:
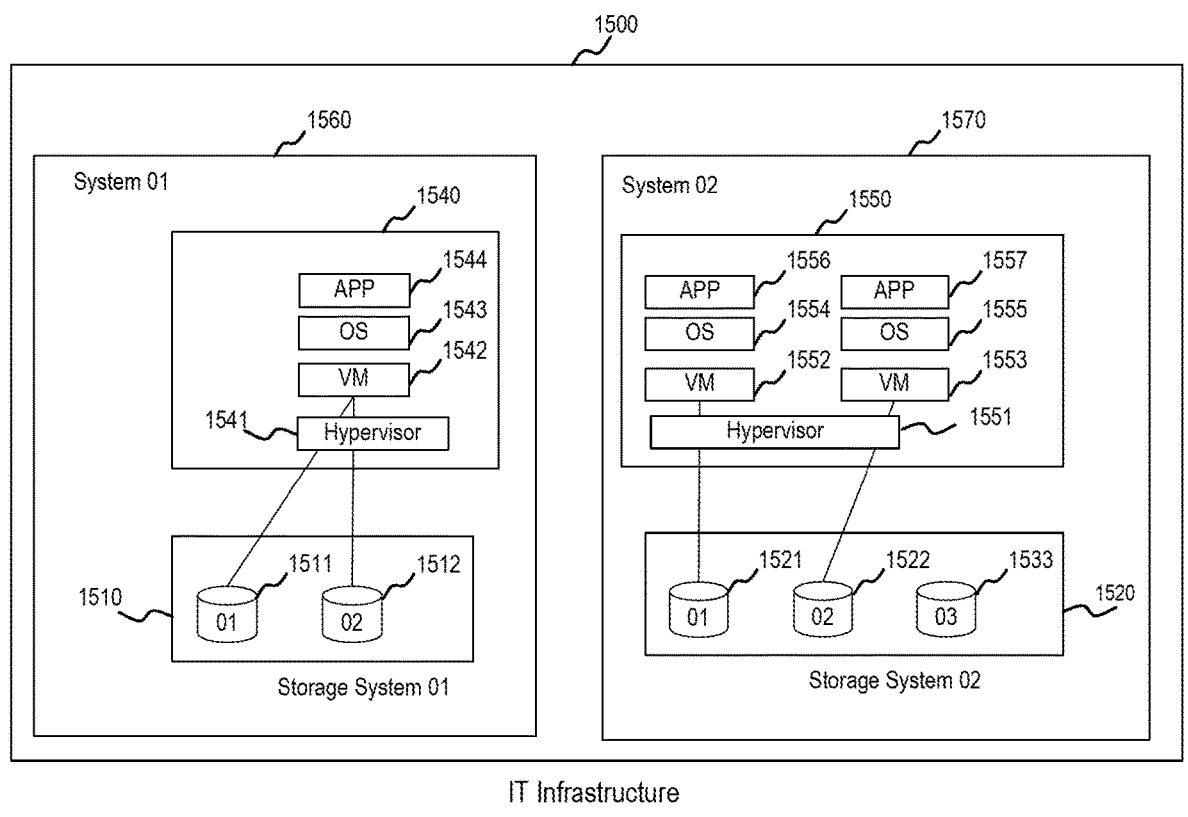
FIG. 1(b) illustrates the logical configuration of the IT infrastructure, in accordance with an example implementation.
Figure 1C:
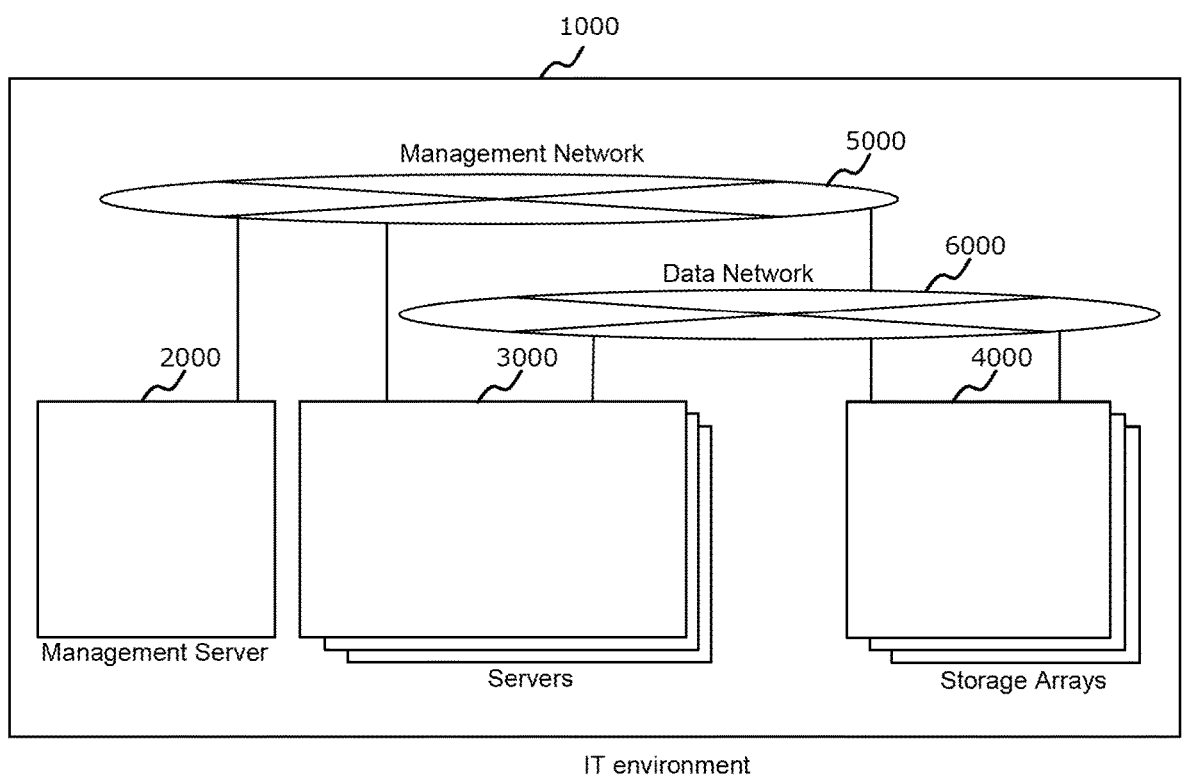
FIG. 1(c) illustrates a physical configuration of the system, in accordance with an example implementation.

FIG. 1(*b*) illustrates the logical configuration of the IT infrastructure, in accordance with an example implementation. Specifically, FIG. 1(*b*) illustrates a logical configuration of the IT infrastructure 1500 of FIG. 1(*a*). IT infrastructure 1500 involves one or more systems. In the example of FIG. 1(*b*), there are systems 01 and 02 (1560 and 1570) respectively. Application 1544, operating system (OS) 1543 and virtual machine (VM) 1542 can run on Hypervisor 1541. This hypervisor is running on Server 1540. Application 1556, 1557, OS 1554 and 1555, and VM 1552 and 1553 can run on Hypervisor 1551. This hypervisor is running on Server 1550. Application 1544 uses Storage volume 1511 and 1512 of Storage system 01 (1510). Application 1556 uses Storage volume 1521 of Storage system 02 (1520). Application 1557 uses Storage volume 1522 of Storage system 02 (1520).

FIG. 1(*c*) illustrates a physical configuration of the system, in accordance with an example implementation. Specifically, FIG. 1(*c*) illustrates a physical configuration of the IT environment in example implementations. IT environment 1000 can include management server 2000, servers 3000, storage arrays 4000, management network 5000 and data network 6000. Servers 3000 and storage arrays 4000 are connected via data network 6000. The data network 6000 can be LAN (Local Area Network) but it is not limited thereto, and other network implementations are also possible depending on the desired implementation. Management server 2000, servers 3000 and storage arrays 4000 are connected via management network 5000. The management network 5000 can be LAN, but is not limited thereto, and other network implementations are also possible depending on the desired implementation. Though management network 5000 and data network 6000 are separated in this example implementation, they can also be implemented as a single converged network.

In this example implementation, management server 2000 and servers 3000 are separated, but the present disclosure is not limited to such a configuration. For example, any server can host a management program. In this example implementation, servers 3000 and storage arrays 4000 are separated, but the present disclosure is not limited to this configuration. For example, servers and storage arrays can be combined into one system.

Figure 2:
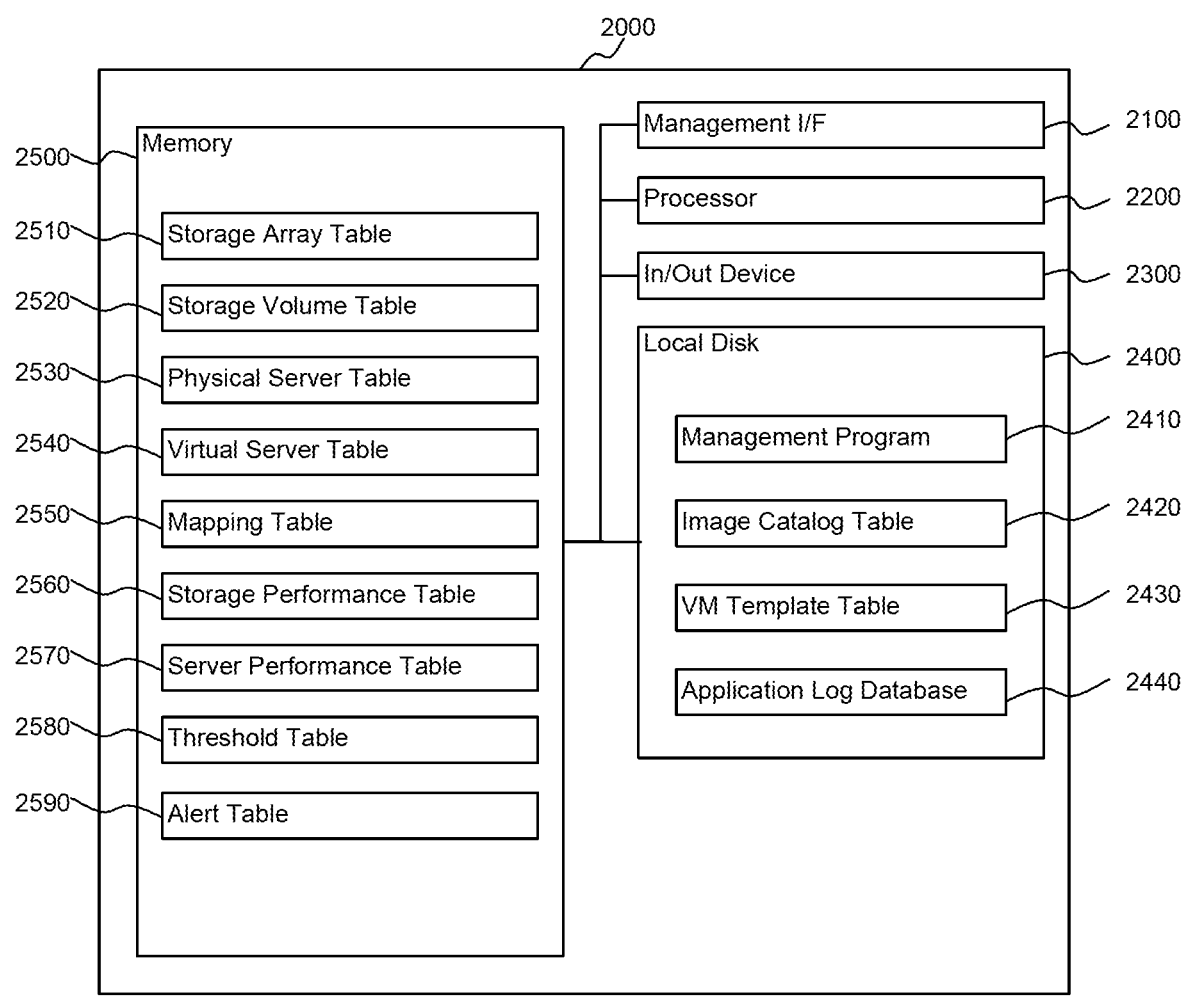
FIG. 2 illustrates a configuration of a management server, in accordance with an example implementation.

FIG. 2 illustrates a configuration of a management server, in accordance with an example implementation. Specifically, FIG. 2 shows the configurations of management server 2000 which includes the cloud system 1000 which can include one or more storage systems and one or more servers communicatively coupled to the management server 2000 over a network. The Management interface 2100 is an interface to the management network 5000. Input and output device 2300 is a user interface such as a monitor, a keyboard and a mouse. Local Disk 2400 contains management program 2410, image catalog table 2420, VM template table 2430 and application log database 2440. Management program 2410 is loaded to Memory 2500 and executed by processor 2200. The procedure of the management program 2410 is disclosed below. Management program 2410 is the same entity as management program 1200 in FIG. 1(*a*). The image catalog table 2420 and VM template table 2430 are loaded to Memory 2500 and used by the management program 2410. These tables are described in detail below. Memory 2500 contains storage array table 2510, storage volume table 2520, physical server table 2530, virtual server table 2540, mapping table 2550, storage performance table 2560, server performance table 2570, threshold table 2580 and alert table 2590. These tables are disclosed in detail below.

Figure 12:
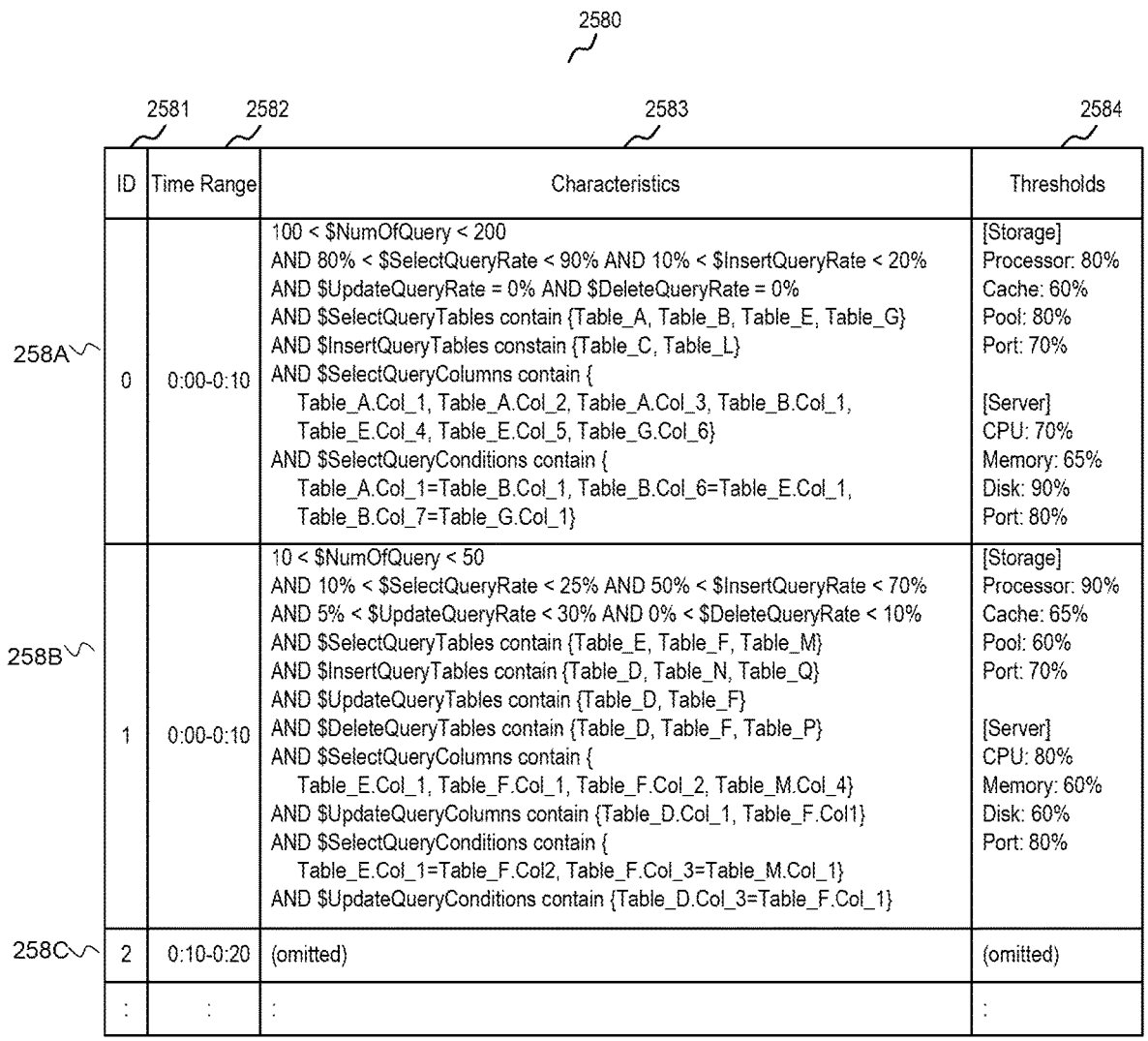
FIG. 12 illustrates a Threshold Table, in accordance with an example implementation.
Figure 17:
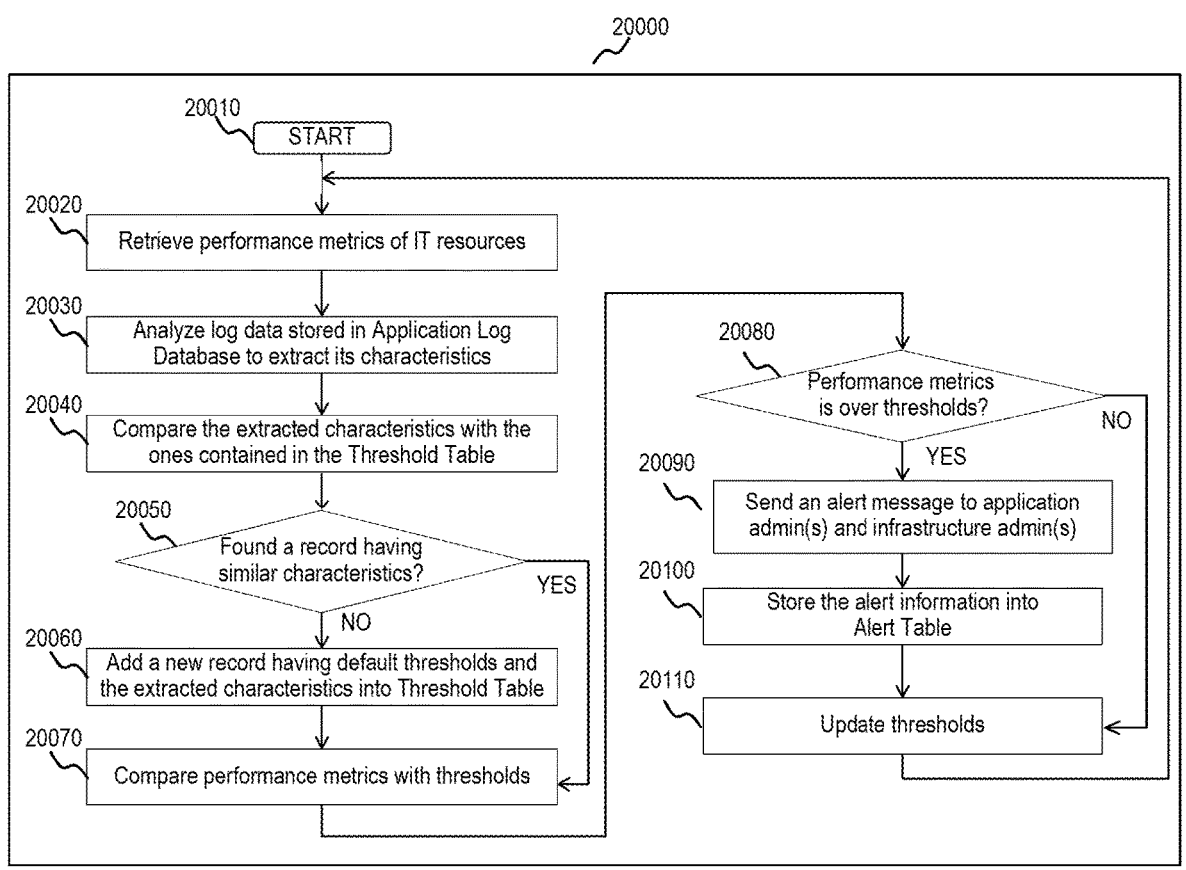
FIG. 17 illustrates the flow diagram of the management program for a system monitoring sub-sequence, in accordance with an example implementation.

Memory 2500 can be configured to store a plurality of thresholds, with each of the plurality of thresholds associated with a system resource of the system as described in further detail in FIG. 12, and a plurality of characteristics of applications executed on the system, wherein each of one or more sets of the plurality of characteristics is associated with a corresponding set of thresholds from the plurality of thresholds as illustrated with respect to FIGS. 12 and 17.

Processor 2200, through loading the management program 2410 can be configured to monitor one or more applications executed on the system; monitor system resources of the system; determine, from characteristics of the one or more applications executed on the system, an associated set of characteristics from the one or more sets of the plurality of characteristics; and for the associated set of characteristics being found from the determination, compare the system resources to the corresponding set of thresholds associated with the associated set of characteristics from the one or more sets of the plurality of characteristics. The processor 2200 is configured to, for the associated set of characteristics not being found from the determination, generating a set of thresholds for the characteristics of the one or more applications executed on the system. The processor 2200 is configured to, for at least one of the system resources exceeding a corresponding threshold from the corresponding set of thresholds from the comparison, issue an alert process associated with the corresponding threshold. Further details of the processor 2200 and the execution of the management program 2410 are described in detail below.

Memory 2500 can be configured to store a resource plan associated with each of a plurality of alert processes as illustrated, for example in alert table 2590 of FIG. 13, and wherein the processor 2200 is configured to execute the resource plan associated with the issued alert process from the plurality of alert processes. The processor 2200 is configured to increase the corresponding threshold upon execution of the resource plan and also configured to monitor an effect of the executed resource plan on the system resources and associate the effect with the resource plan in the memory 2500.

FIG. 3 illustrates an image catalog table, in accordance with an example implementation. Specifically, FIG. 3 illustrates the image catalog table 2420. This catalog is referred when the application administrator 1010 deploys applications by using self-service portal 1600. The image catalog table 2420 is loaded from local disk 2400 to memory 2500 of the management server 2000. Column 2421 shows identifications of the catalogs. Column 2422 shows types of the applications. Column 2423 shows names of operating systems on which applications run. Column 2424 shows versions of operating systems on which applications run. Column 2425 shows names of applications. Column 2426 shows versions of applications. Column 2427 shows locations of storage volumes in which the applications are contained. These storage volumes are called "golden images". Each row 242A, 242B, and 242C shows each image catalog. For example, row 242A shows the catalog of a database application. This example catalog is for MySQL 5.6 on Ubuntu 14.10, but the present disclosure is not limited to this configuration and other configurations are also possible depending on the desired implementation. This image is located on the volume 01 of the storage system 01.

FIG. 4 illustrates a VM Template Table, in accordance with an example implementation. In particular, FIG. 4 shows the VM template table 2430. This template describes the resource configurations of several VM types. This table is loaded from local disk 2400 to memory 2500 of the management server 2000. Column 2431 shows identifications of the templates. Column 2432 shows VM types. Column 2433 shows processor types. The values of the column can be normal, high memory, high CPU and High I/O. Column 2434 shows processor performance. The values are relative values on the basis of normal CPU. Column 2435 shows numbers of processors. Column 2436 shows capacities of the memories. Column 2437 shows maximum TOPS. Column 2438 shows unit prices. Each row 243A, 243B, 243C, and 243D shows the resource configuration of each VM type. For example, row 243A shows the configuration of the normal VM. This type of VM includes two normal processors and 4 GB memory. Unit price of this type of VM is 10.

FIG. 5 illustrates a Storage Array Table, in accordance with an example implementation. Specifically, FIG. 5 illustrates the physical storage table 2510. This table is created in the memory 2500 by management program 2410. Column 2511 shows identifications of storage arrays. Column 2512 shows processors of the storage arrays. Column 2513 shows ports of the storage arrays. Column 2513 shows cache resources of the storage arrays. Column 2514 shows pools of resources (typically capacities) of the storage arrays. Each row 251A, 251B, 251C and 251D shows the configuration of each physical storage array. For example, row 251A and 251B shows configurations of storage array 01. The storage array has two processors with 8 cores each, 8 Gbps of port A, B, C and D, 160 GB of cache C-01 and 128 GB of cache C-02, 300 TB of pool Pool-01 and Pool-02, and 500 TB of pool Pool-03 and Pool-04.

FIG. 6 illustrates a Storage Volume Table, in accordance with an example implementation. Specifically, FIG. 6 illustrates storage volume table 2520. This table is created in the memory 2500 by management program 2410. Column 2521 shows identifications of storage arrays owning storage volumes. Column 2522 shows identifications of storage volumes. Column 2523 shows capacities of each storage volume. Column 2524 shows identifications of pools from which storage volumes are curved. Each row 252A, 252B, 252C, 252D and 252E shows the configuration of each storage volume. For example, row 252A shows a configuration of storage volume 01 of storage array 01. This storage volume has 10 TB of capacity and curved from Pool-01.

FIG. 7 illustrates a Physical Server Table, in accordance with an example implementation. Specifically, FIG. 7 shows physical server table 2530. This table is created in the memory 2500 by management program 2410. Column 2531 shows the identifications of physical servers. Column 2532 shows the numbers of cores and types of CPU of each physical server. Column 2533 shows the capacities of memory resources of each physical server. Column 2534 shows ports of each physical server. Each row 253A, 253B, 253C, 253D, and 253E shows the configuration of each physical server. For example, row 253A shows a configuration of physical server 01. The physical server has 12 cores of Normal CPU, 32 GB of memory, 4 Gbps of port A and B.

FIG. 8 illustrates a Virtual Server Table, in accordance with an example implementation. Specifically, FIG. 8 shows virtual server table 2540. This table is created in the memory 2500 by management program 2410. Column 2541 shows the identifications of the virtual servers. Column 2542 shows the identifications of the physical servers on which the virtual servers are running. Column 2543 shows the numbers of CPU cores assigned to each virtual server. Column 2544 shows the capacities of memory resources assigned to each virtual server. Column 2545 the shows ports assigned to each virtual server. Each row 254A, 254B, 254C, and 254D shows the configuration of each virtual server. For example, row 254A shows a configuration of virtual server 01. This virtual server is hosted on physical server 01 and has 2 CPU cores, 4 GB of memory and 4 Gbps of port A.

FIG. 9 illustrates the Mapping Table, in accordance with an example implementation. Specifically, FIG. 9 shows mapping table 2550. This table is created in the memory 2500 by management program 2410. Column 2551 shows the identifications of applications. Column 2552 shows the names of the applications. This name is specified in Application name field 1620-B of GUI 1600-B of self-service portal 1600 by application administrator 1010. Column 2553 shows the identifications of image catalogs. Application type is selected in Application type field 1610-B from GUI 1600-B of self-service portal 1600 by application administrator 1010. By matching the information and type column 2422 in the image catalog table 2420, the identifications of Column 2553 can be decided. Column 2554 shows the identifications of virtual servers on which the applications are running. Column 2555 shows the names of the virtual servers. In this example implementation, these names are automatically created based on application name by management program, but other implementations are also possible depending on the desired implementation. For example, the application administrator can specify the name of each virtual server. Column 2556 shows the identifications of ports of the virtual servers. Column 2557 shows the identifications of storage arrays. Column 2558 shows the identifications of ports of the storage arrays. Column 2559 shows the identifications of storage volumes.

Each row 255A, 255B, 255C, 255D, 255E, 255F, and 255G, shows the end-to-end mapping between applications and storage volumes. For example, row 255B shows that application 2 has name of "Web-C", is created from image catalog 4, and is running on virtual server 03 whose name is "WebDB". Further, two storage volumes 052 and 055 are assigned to the virtual server 03 for the application. The storage volume 052 of storage array 02 is assigned to the virtual server 03 through the port B of the storage array and the port A of the virtual server. The storage volume 055 of storage array 01 is assigned to the virtual server 03 through the port A of the storage array and the port A of the virtual server.

FIG. 10 illustrates the Storage Performance Table, in accordance with an example implementation. Specifically, FIG. 10 shows storage performance table 2560. This table is created in the memory 2500 by management program 2410. Column 2561 shows the identifications of storage arrays. Column 2562 shows the identifications of storage volumes. Column 2563 shows the identifications of historical performance data of the storage volumes. Timestamps can be used as the history ID 2563. Column 2564 shows the usage rates of processors. Column 2565 shows the usage rate of cache resources assigned to the storage volumes. Column 2566 shows the usage rate of pools from which the storage volumes are curved. Column 2567 shows the usage rate of ports assigned to the storage volumes. Each row 256A and 256B shows the historical performance data of each storage volume. For example, row 256A shows performance data of storage volume 01 of storage array 01 which has at least three historical data (from 0 to 2).

FIG. 11 illustrates the Server Performance Table, in accordance with an example implementation. Specifically, FIG. 11 shows the server performance table 2570. This table is created in the memory 2500 by management program 2410. Column 2571 shows the identifications of physical and/or virtual servers. Column 2572 shows flags the indicating whether the servers are physical server or not. If the value is "YES" then the server is a physical server. If the value is "NO" then the server is a virtual server. Column 2573 shows the identifications of historical performance data of the servers. Timestamps can be used as the history ID 2573. Column 2574 shows the usage rates of CPUs of the servers. Column 2575 shows the usage rate of memory resources of the servers. Column 2576 shows usage rate of disks of the servers. Column 2577 shows the usage rate of ports of the servers. Each row 257A, and 257B shows the historical performance data of each server. For example, row 257A shows the performance data of server 01 which is a physical server and has at least three historical data (from 0 to 2).

FIG. 12 illustrates a Threshold Table, in accordance with an example implementation. Specifically, FIG. 12 shows threshold table 2580. This table is created in the memory 2500 by management program 2410. Column 2581 shows the identifications of thresholds. Column 2582 shows the time range of the thresholds. Column 2583 shows the characteristics of applications. Column 2584 shows the thresholds. Each row 258A, 258B and 258C shows a threshold. For example, row 258A shows threshold 0 which is active from 0:00 to 0:10. This threshold is related to characteristics of an application log recorded within the time range where the number of Structured Query Language (SQL) queries issued is between 100 and 200, the percentage of SELECT queries is between 80% and 90%, the percentage of INSERT queries is between 10% and 20%, the percentage of UPDATE queries and DELETE queries equals 0%, the target tables of SELECT queries include Table_A, Table_B, Table_E and Table_G, the target tables of INSERT queries include Table_C and Table_L, the target columns of SELECT queries include Col_1, Col_2 and Col_3 of Table_A, Col_1 of Table_B, Col_4 and Col_5 of Table_E and Col_6 of Table_G, and the conditions of SELECT queries include Table_A.Col_1=Table_B.Col_1, Table_B.Col_6=Table_E.Col_1, and Table_B.Col_7=Table_G.Col_1. The actual values of thresholds are defined as 80% of storage processor usage, 60% of storage cache usage, 80% of storage pool usage, 70% of storage port usage, 70% of server CPU usage, 65% of server memory usage, 90% of server disk usage and 80% of server port usage.

The characteristics of the application log are not limited to the examples shown in FIG. 12. Other characteristics like order of SELECT, INSERT, UPDATE and DELETE queries or the actual queries issued can be used, depending on the desired implementation. Furthermore, activities of applications other than issuing SQL queries can be used as characteristics. One example, the invocation of Application Program Interfaces (APIs) of other applications is one example. How these thresholds can be used and updated is illustrated below.

FIG. 13 illustrates an Alert Table, in accordance with an example implementation. Specifically, FIG. 13 shows alert table 2590. This table is created in the memory 2500 by management program 2410. Column 2591 shows the identifications of alerts. Column 2592 shows the time of alert issued. Column 2593 shows the identifications of thresholds. Column 2594 shows the thresholds at the time of alert issued. Column 2595 shows the workloads at the time of alert issued. Column 2596 shows the trends of workloads. Each row 259A, 259B and 259C, shows an alert issued by management program 2410. For example, row 259A shows an alert issued at 0:05 on Jun. 18, 2015. This alert was issued because some workloads were over threshold 0. The thresholds at the time were 80% of storage processor usage, 60% of storage cache usage, 80% of storage pool usage, 70% of storage port usage, 70% of server CPU usage, 65% of server memory usage, 90% of server disk usage and 80% of server port usage. The workloads monitored at the time were 81% of storage processor usage, 50% of storage cache usage, 50% of storage pool usage, 30% of storage port usage, 30% of server CPU usage, 50% of server memory usage, 40% of server disk usage and 30% of server port usage. This record also indicates that the trend of these workloads was gradual increase.

Figure 14:
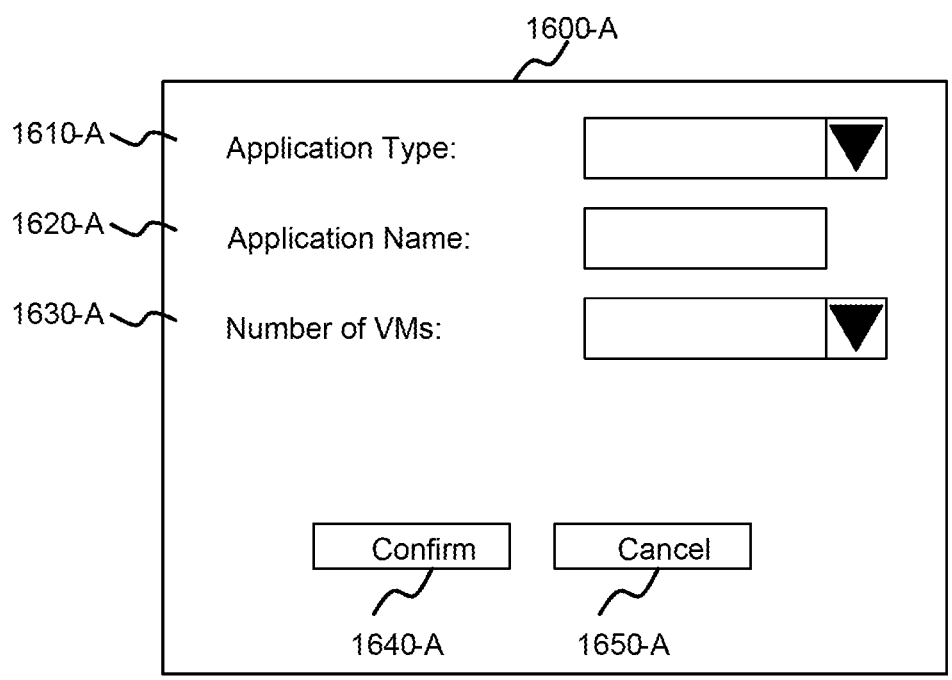
FIG. 14 illustrates a Self Service Portal with an Application Deployment Graphics User Interface (GUI), in accordance with an example implementation.

FIG. 14 illustrates a Self Service Portal with an Application Deployment Graphical User Interface (GUI), in accordance with an example implementation. Specifically, FIG. 14 shows GUI 1600-A of self-service portal 1600. This GUI is used when the system administrator 1010 deploys applications on IT environment 1000. The system administrator selects application type 1610-A, for example "Web Server". Candidates are displayed based on the type 2422, OS name 2423, OS version 2424, application name 2425 and application version 2426 of the image catalog table 2420. Next, the system administrator inputs an application name 1620-A, for example "Web-A". Next, the system administrator selects the number of the VMs 1630-A. If the Confirm button 1640-A is selected, management program 2410 displays confirmation GUI 1600-B as shown in FIG. 15. If the Cancel button 1650-A is selected, management program 2410 cancels the deployment process.

FIG. 15 illustrates a Self Service Portal with a Confirmation GUI, in accordance with an example implementation. Specifically, FIG. 15 shows confirmation GUI 1600-B of self-service portal 1600. This GUI is displayed after application administrator 1010 selects the Confirm button 1640-A from application deployment GUI 1600-A of self-service portal 1600.

Field 1610-B is the application type. Field 1620-B is the application name. Field 1630-B is the number of VMs which run the application. Field 1640-B is the information of the VMs being provisioned. Column 1641-B is the name of the VM. This name is created from application name 1620-B by the management program 2410. Column 1642-B is the number and type of the CPU. Column 1643-B is the capacity of the memory. Column 1644-B is the capacity of storage volumes. Each row 164A-B and 164B-B shows the configuration of each VM. For example, row 164A-B shows the configurations of a VM named "DB-A-1". This VM has 16 High CPUs, 8 GB of memory and 2 TB of storage volume. Field 1650-B is the calculated total cost of the application. According to the unit price 2438 of VM template table 2430, Unit cost of one "High I/O" VM is 90. The number of "High I/O" VM allocated for this application is 2. Therefore, the total cost of this application is 180. The total cost can include costs of storage volumes.

If OK button 1660-B is selected, the management program 2410 executes an application deployment process. If Cancel button 1670-B is selected, the management program 2410 cancels the deployment process. If the Back button 1680-B is selected, the management program 2410 redisplays the provisioning GUI 1600-A of self-service portal 1600.

Figure 16:
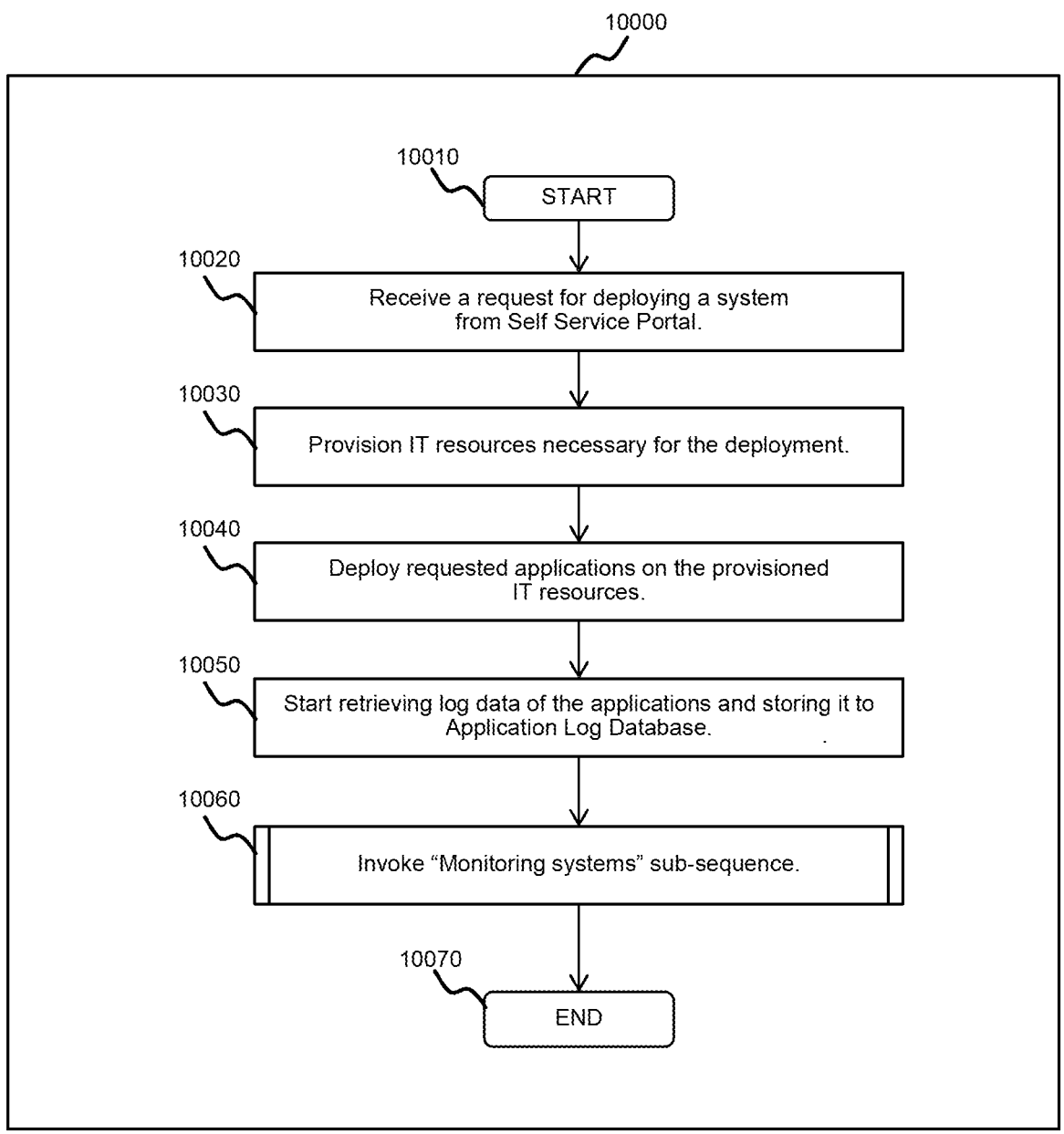
FIG. 16 illustrates a flow diagram for the management program for the sequence of system deployment, in accordance with an example implementation.

FIG. 16 illustrates a flow diagram for the management program for the sequence of system deployment, in accordance with an example implementation. Specifically, FIG. 16 illustrates the flowchart of the management program 2410 for deploying systems. The flow begins at 10010, which is the start of the procedure. At 10020, the management program 2410 receives a request for deploying a system from the self-service portal 1600. Parameters as shown in FIG. 15 (Self Service Portal—Confirmation GUI) are passed to Management program 2410. At 10030. the management program 2410 provisions IT resources necessary for the deployment. For example, the management program 2410 creates storage volumes, create VMs and allocate storage volumes to VMs. At 10040, the management program 2410 deploys requested applications on the provisioned IT resources. At 10050, the management program 2410 starts retrieving log data of the applications and storing it to Application Log Database. At 10060, the management program 2410 invokes a sub-sequence of monitoring systems. The procedure of this sub-sequence is disclosed in more detail below. At 10070, the management program 2410 ends the application deployment process.

FIG. 17 illustrates the flow diagram of the management program for a system monitoring sub-sequence, in accordance with an example implementation. Specifically, FIG. 17 illustrates the flowchart of management program 2410 for monitoring systems. At 20010, the management program 2410 begins the procedure to monitor systems. At 20020, the management program 2410 retrieves performance metrics of IT resources. The management program 2410 gathers usage rates of storage processors, storage caches, storage pools, storage ports, server CPUs, server memories, server disks and server ports, and other metrics depending on the desired implementation. At 20030, the management program 2410 analyzes log data stored in the Application Log Database to extract its characteristics. At 20040, the management program 2410 compares the extracted characteristics with the ones contained in Threshold table 2580. At 20050, the management program 2410 judges whether a record having similar characteristics was found or not. The similarity can be calculated by counting number of characteristics matched, or by other methods depending on the desired implementation. Management program 2410 picks up one record which has highest similarity. If the highest similarity is lower than pre-defined score, management program 2410 may conclude that no records having similar characteristics were found. If the result is "Yes" then the process proceeds to 20070. If the result is "No" then the process proceeds to 20060. At 20060, the management program 2410 adds a new record having default thresholds and the characteristics extracted at 20030 into Threshold table 2580.

At 20070, the management program 2410 compares performance metrics retrieved in 20020 with thresholds which are either thresholds 2584 of the record found at 20040 and 20050, or the ones of the new record created from 20060. At 20080, the management program 2410 judges if at least one of the performance metrics is over one of the corresponding thresholds. If the result is "Yes" then the process proceeds to 20090. If the result is "No" then the process proceeds to 20110.

At 20090, the management program 2410 sends an alert message to one or more application administrators and one or more IT infrastructure administrators. At 20100, the management program 2410 stores the alert information into alert table 2590. At 20110, the management program 2410 updates thresholds which are either thresholds 2584 of the record found from the flow at 20040 and 20050, or thresholds from the new record created from the flow at 20060. In an example implementation, new thresholds can be calculated by the following formula: $Th_{new}=Th+(P-Th) \times w$ In this formula, $Th_{new}$ is a new value of the threshold, Th is a value of current threshold, P is a value of performance metric and w is a value of pre-defined weight between 0 and 1. Other methodologies may also be utilized depending on the desired implementation.

FIG. 18 illustrates an Application Log Database, in accordance with an example implementation. Specifically, FIG. 18 illustrates application log database 2440. Column 2441 shows the identifications of logs. Column 2442 shows the identifications of applications. This ID is related to Application ID 2551 in mapping table 2550 as shown in FIG. 9. Column 2443 shows logs of the applications. Each row 244A, 244B and 244C shows the logs of an application. For example, row 244A shows the logs of an application where ID is 0. A log of each application may be overwritten or kept as an old log when a new log is retrieved by the management program 2410.

Thus in the example implementations described above, the management program uses and updates performance thresholds with considering application characteristics. The management program compares the monitored performance metrics with thresholds having similar application characteristics as the one monitored. Through the example implementations described above, the management program can manage performance thresholds and avoid unnecessary updates based on different application activities.

In other example implementations described below, the management program can be configured to create and manage remediation plans to solve performance issues.

Figure 19:
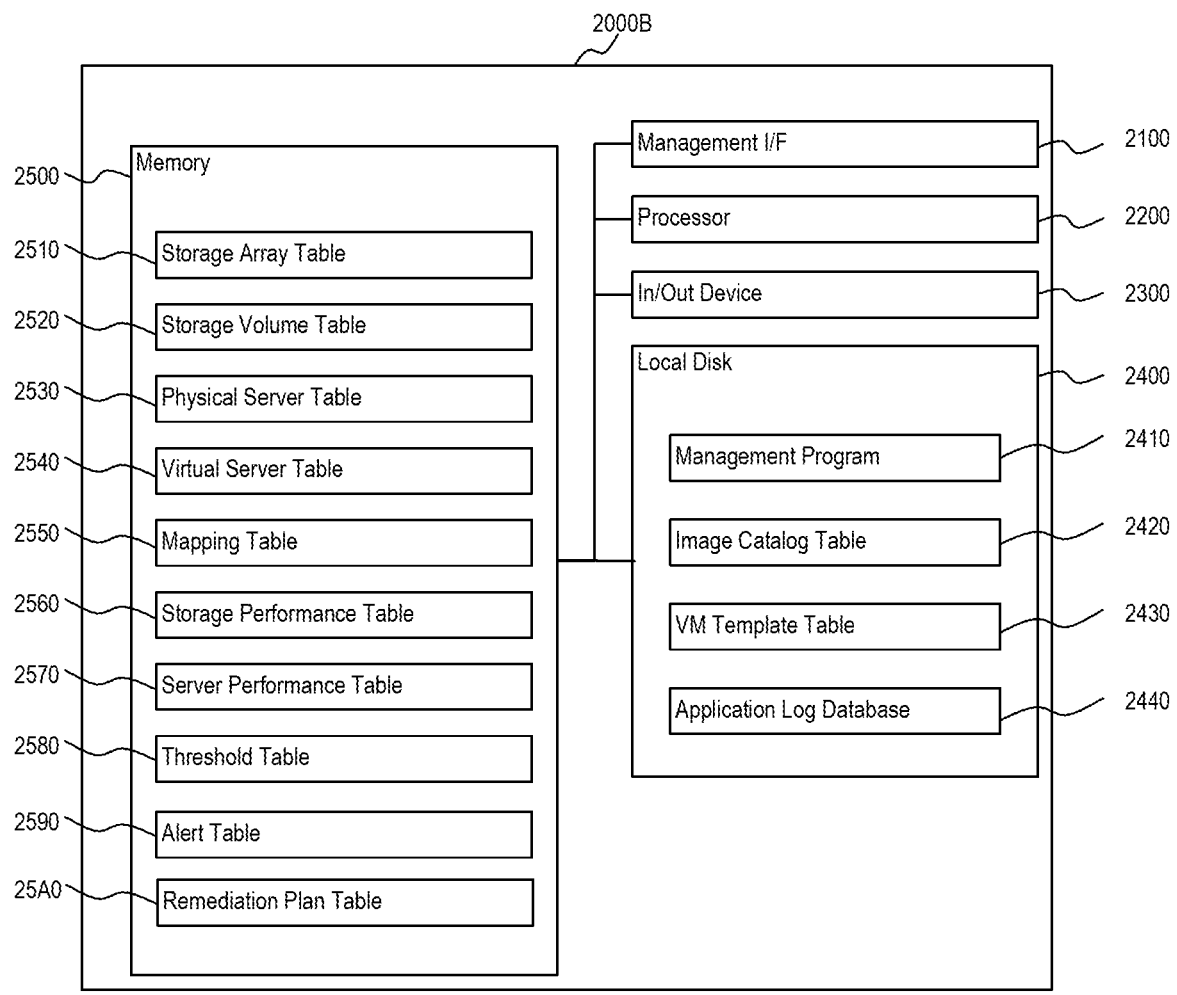
FIG. 19 illustrates a configuration of a management server, in accordance with an example implementation.

FIG. 19 illustrates a configuration of a management server, in accordance with an example implementation. Specifically, FIG. 19 shows a configuration of management server 2000B in this example implementation. The difference between the configuration of management server 2000 shown in FIG. 2 and this configuration 2000B is that configuration 2000B has Remediation Plan Table 25A0 as described in further detail in FIG. 20.

FIG. 20 illustrates a remediation plan table in accordance with an example implementation. Specifically, FIG. 20 shows remediation plan table 25A0. This table is created in the memory 2500 by management program 2410. Column 25A1 shows the identifications of the plans. Column 25A2 shows the identifications of the alerts. Column 25A3 shows the descriptions of the remediation plans. Column 25A4 shows the last execution time of the plans. Column 25A5 shows the effects of the plans. Each row 25AA, 25AB and 25AC shows a remediation plan. For example, row 25AA shows plan 0 which was created by management program 2410 when alert 0 was issued. The content of this plan is to allocate one additional storage processor to reduce the burden on the current storage processor. This plan was executed at 0:05 on Jun. 18, 2015 lastly and the plan reduced the usage rate of a storage processor from 81% to 40%. Row 25AC has a null value in Last Execution Time 25A4. The null value indicates that the plan was created but not executed yet. In this case, Effects 25A5 shows estimated effects instead of actually monitored effects.

Figure 21:
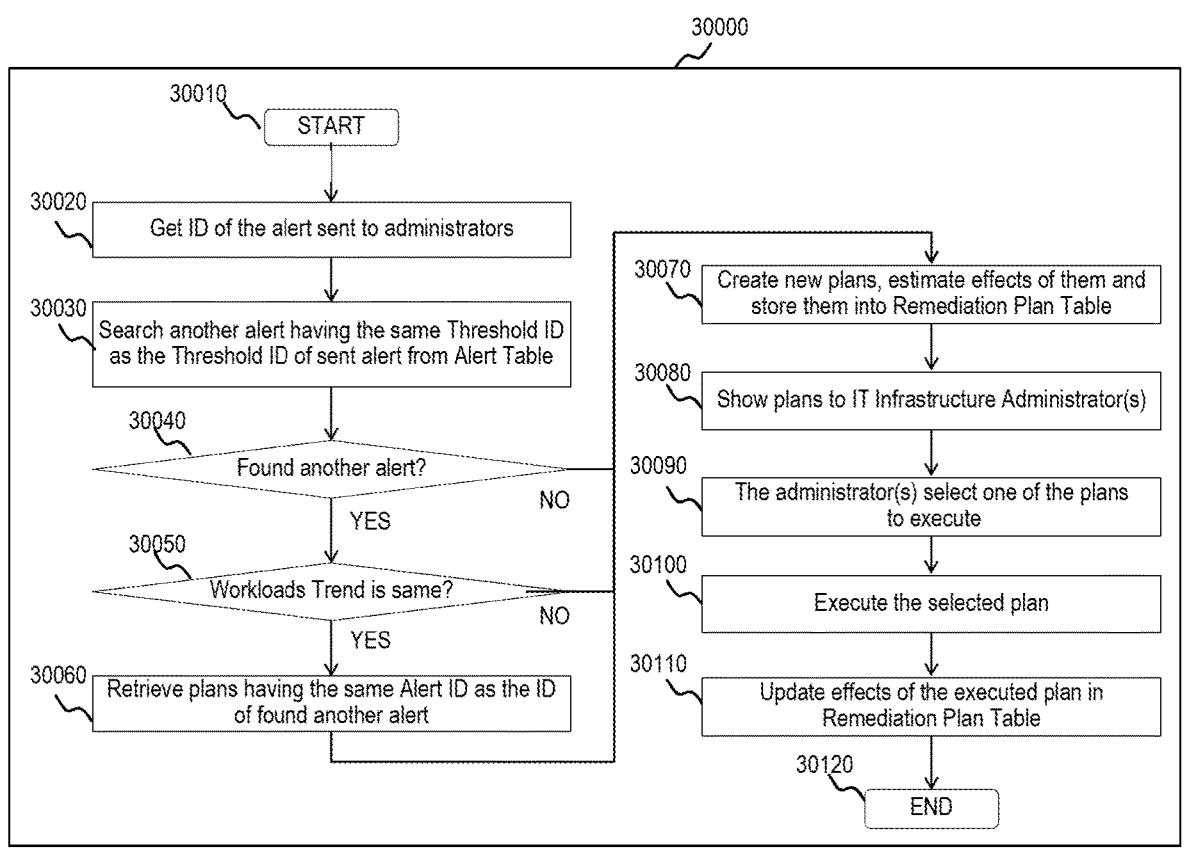
FIG. 21 illustrates a flow chart for the management program for the creation of remediation plans, in accordance with an example implementation.

FIG. 21 illustrates a flow chart for the management program for the creation of remediation plans, in accordance with an example implementation. Specifically, FIG. 21 shows a flowchart of management program 2410 for creating remediation plans. This flowchart is triggered by management program 2410 itself after the management program 2410 send an alert message to administrators in the flow of 20090 of monitoring systems sequence 20000 in FIG. 17. The procedure begins at 30010. At 30020, the management program 2410 gets the ID of the alert sent to administrators from the flow of 20090 of monitoring systems sequence 20000 in FIG. 17. At 30030, the management program 2410 searches another alert having the same threshold ID as the threshold ID of a sent alert from alert table 2590. If two or more alerts are found, management program 2410 picks up one whose values of thresholds are most similar to the values of thresholds of the sent alert. At 30040, the management program 2410 judges whether another alert is found or not. If the result is "Yes" then the process proceeds to 30050. If the result is "No" then the process proceeds to 30070. At 30050, the management program 2410 judges whether the workloads trend 2596 of the found alert and the one of the sent alert is the same or not. If the result is "Yes" then the process proceeds to 30060. If the result is "No" then the process proceeds to 30070. At 30060, the management program 2410 retrieves plans having the same alert ID as the one of the found alert. This means that management program 2410 retrieves existing plans created for a similar situation (i.e. similar characteristics of applications and trends of workloads).

At 30070, the management program 2410 creates new plans to solve the alerted performance issues, estimates the effects and stores the estimated effects into remediation plan table 25A0. If the flow is executed from the flow at 30060, if one or more created plans are the same as the plans retrieved from the flow at 30060, the management program 2410 discards the created plans. This is because the plans retrieved from the flow at 30060 may have been executed before and these may have actually monitored effects rather than estimated effects. At 30080, the management program 2410 shows plans including the plans retrieved from the flow at 30060 and the ones created in the flow at 30070 to IT infrastructure administrator(s). The management program 2410 may show these two types of plans (existing plans and newly created plans) separately. At 30090, the IT infrastructure administrator(s) 1030 select one of plans to execute. At 30100, the management program 2410 executes the selected plan. In this example implementation, the selection and execution of a plan is done manually but management program 2410 can select and execute it automatically. At 30110, the management program 2410 updates the effects of the executed plan in Remediation Plan Table. At 30120, the management program 2410 ends the sequence.

In this example implementation, the management program manages remediation plans to solve performance issues in view of application characteristics. By responding to an issued alert, the management software retrieves existing plans created for similar situations. Thus, the management program can provide remediation plans matched to the situations.

Figure 22A:
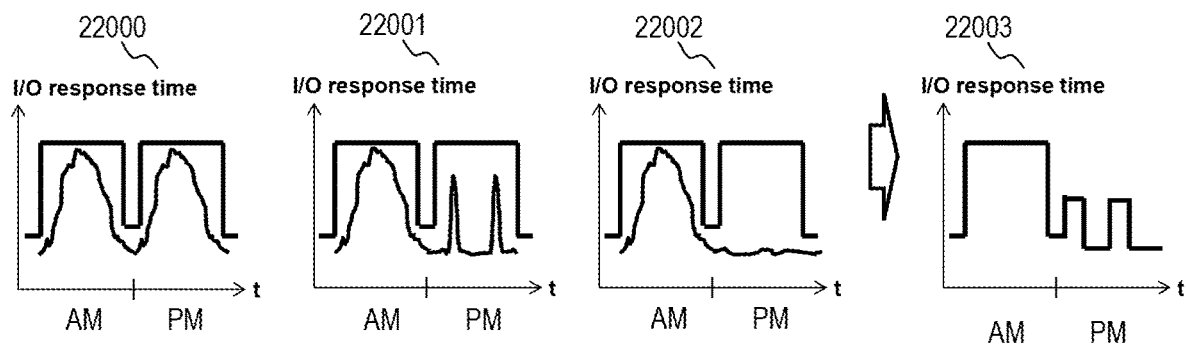
FIGS. 22(a) and 22(b) illustrate an execution of threshold modeling with and without the use of the example implementations described herein, respectively.
Figure 22B:
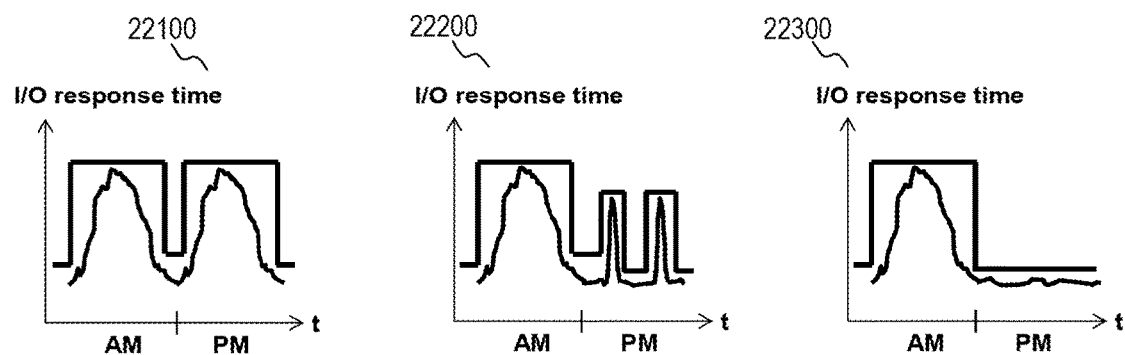

FIGS. 22(*a*) and 22(*b*) illustrate an example execution of threshold modeling with and without the use of the example implementations described herein, respectively. In FIG. 22(*a*), I/O response times for the system are illustrated at 22000, 22001 and 22002 along with the thresholds for the system. In the situation illustrated at 22000, a first set of applications is executed throughout the day, with a threshold model that accurately reflects the expected threshold for the first set of applications. In the situation illustrated at 22001, the first set of applications is executed during the morning, and a second set of applications is executed during the afternoon and evening. In the situation illustrated at 22002, the first set of applications is executed during the morning and a third set of applications is executed in the evening. Based on the feedback of the I/O response times at 22000, 22001, and 22002, the management software calculates and updates to the new threshold as illustrated at 22003. However, because the I/O response times are taken without considering the changes of the characteristics of the applications executed in the system, the new thresholds may not be accurate, particularly if the first set of applications is executed throughout the day.

In FIG. 22(*b*), because the application characteristics are monitored, the example implementations can dynamically change the thresholds of the I/O response time based on the characteristics of the executed applications. At 22100, the threshold is based on the characteristics of the first set of applications as executed throughout the day. At 22200, the thresholds are changed between the morning and the afternoon and evening based on the characteristics of the first set of applications and the second set of applications when executed. At 22300, the thresholds are changed between the morning and the afternoon and evening based on the characteristics of the first set of applications and the third set of applications when executed. Thus, I/O response time thresholds that accurately reflect the system based on the applications being executed can be generated.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A management computer configured to manage a system, the management computer comprising:
    a memory configured to store a plurality of thresholds, each of the plurality of thresholds associated with a system resource of the system, and a plurality of characteristics of applications executed on one or more of virtual machines and physical servers of the system, wherein each of one or more sets of the plurality of characteristics is associated with a corresponding set of thresholds from the plurality of thresholds; and
    a processor, configured to:
    monitor one or more applications executed on the one or more of the virtual machines and the physical servers of the system;
    monitor system resources of the system based on performance metrics of the system resource;
    determine, from characteristics of the one or more applications executed on the one or more of the virtual machines and the physical servers of the system, an associated set of characteristics from the one or more sets of the plurality of characteristics;
    for the associated set of characteristics being found from the determination, compare the system resources to the corresponding set of thresholds associated with the associated set of characteristics from the one or more sets of the plurality of characteristics;
    determine whether a record having similar characteristics is found between the system resource and the corresponding set of thresholds associated with the associated set of characteristics, wherein the similarity is calculated based on a number of characteristics matched, wherein if the similarity is below a predefined score, the processor adds a new record having a generated set of thresholds for the associated set of characteristics from the one or more sets of the plurality of characteristics;
    compare the performance metrics of the system resource with the characteristics of the record having similar characteristics or with the new record having the associated set of characteristics;
    determine if at least one of the performance metrics exceeds one of the corresponding set of thresholds; and
    for at least one of the performance metrics exceeding the one of the corresponding set of thresholds, issue an alert process associated with the corresponding threshold.

2. The management computer of claim 1, wherein the memory is configured to store a resource plan associated with each of a plurality of alert processes, and wherein the processor is configured to execute the resource plan associated with the issued alert process from the plurality of alert processes.

3. The management computer of claim 2, wherein the processor is configured to increase the corresponding threshold upon execution of the resource plan.

4. The management computer of claim 2, wherein the processor is configured to monitor an effect of the executed resource plan on the system resources and associate the effect with the resource plan in the memory.

5. A method for managing a system, the method comprising:
    managing a plurality of thresholds, each of the plurality of thresholds associated with a system resource of the system, and a plurality of characteristics of applications executed on one or more of virtual machines and physical servers of the system, wherein each of one or more sets of the plurality of characteristics is associated with a corresponding set of thresholds from the plurality of thresholds,
    monitoring one or more applications executed on the one or more of the virtual machines and the physical servers of the system;
    monitoring system resources of the system based on performance metrics of the system resource;
    determining, from characteristics of the one or more applications executed on the one or more of the virtual machines and the physical servers of the system, an associated set of characteristics from the one or more sets of the plurality of characteristics;
    for the associated set of characteristics being found from the determination, comparing the system resources to the corresponding set of thresholds associated with the associated set of characteristics from the one or more sets of the plurality of characteristics;
    determining whether a record having similar characteristics is found between the system resource and the corresponding set of thresholds associated with the associated set of characteristics, wherein the similarity is calculated based on a number of characteristics matched, wherein if the similarity is below a predefined score, the processor adds a new record having a generated set of thresholds for the associated set of characteristics from the one or more sets of the plurality of characteristics;

comparing the performance metrics of the system resource with the characteristics of the record having similar characteristics or with the new record having the associated set of characteristics;

determining if at least one of the performance metrics exceeds one of the corresponding set of thresholds; and for at least one of the performance metrics exceeding the one of the corresponding set of thresholds, issuing an alert process associated with the corresponding threshold.

6. The method of claim 5, further comprising managing a resource plan for each of a plurality of alert processes, and executing the resource plan associated with the issued alert process from the plurality of alert processes.

7. The method of claim 6, further comprising increasing the corresponding threshold upon execution of the resource plan.

8. The method of claim 6, further comprising monitoring an effect of the executed resource plan on the system resources and associating the effect with the resource plan in the memory.

9. A non-transitory computer readable medium, storing instructions for managing a system, the instructions comprising:

managing a plurality of thresholds, each of the plurality of thresholds associated with a system resource of the system, and a plurality of characteristics of applications executed on one or more of virtual machines and physical servers of the system, wherein each of one or more sets of the plurality of characteristics is associated with a corresponding set of thresholds from the plurality of thresholds, monitoring one or more applications executed on the one or more of the virtual machines and the physical servers of the system;

monitoring system resources of the system based on performance metrics of the system resource;

determining, from characteristics of the one or more applications executed on the one or more of the virtual machines and the physical servers of the system, an associated set of characteristics from the one or more sets of the plurality of characteristics;

for the associated set of characteristics being found from the determination, comparing the system resources to the corresponding set of thresholds associated with the associated set of characteristics from the one or more sets of the plurality of characteristics;

determining whether a record having similar characteristics is found between the system resource and the corresponding set of thresholds associated with the associated set of characteristics, wherein the similarity is calculated based on a number of characteristics matched, wherein if the similarity is below a predefined score, the processor adds a new record having a generated set of thresholds for the associated set of characteristics from the one or more sets of the plurality of characteristics;

comparing the performance metrics of the system resource with the characteristics of the record having similar characteristics or with the new record having the associated set of characteristics;

determining if at least one of the performance metrics exceeds one of the corresponding set of thresholds; and for at least one of the performance metrics exceeding the one of the corresponding set of thresholds, issuing an alert process associated with the corresponding threshold.

10. The non-transitory computer readable medium of claim 9, wherein the instructions further comprise:

managing a resource plan for each of a plurality of alert processes;

executing the resource plan associated with the issued alert process from the plurality of alert processes;

increasing the corresponding threshold upon execution of the resource plan;

monitoring an effect of the executed resource plan on the system resources; and associating the effect with the resource plan in the memory.

11. The non-transitory computer readable medium of claim 9, wherein the instructions further comprise:

managing a resource plan for each of a plurality of alert processes;

determining the resource plan associated with the issued alert process from the plurality of alert processes;

for the associated resource plan being found from the determination:

increasing the corresponding threshold upon execution of the resource plan;

monitoring an effect of the executed resource plan on the system resources; and associating the effect with the resource plan in the memory;

for the associated resource plan not being found from the determination:

retrieving one or more resource plans having a same set of thresholds and workload trend as the issued alert;

generating one or more resource plans having an effect on the corresponding threshold;

executing one of the retrieved one or more resource plans and the generated one or more resource plans.

* * * * *